July 30, 1940.
C. JENSEN
2,209,625
HAY LOADER
Filed Dec. 1, 1938
2 Sheets-Sheet 1
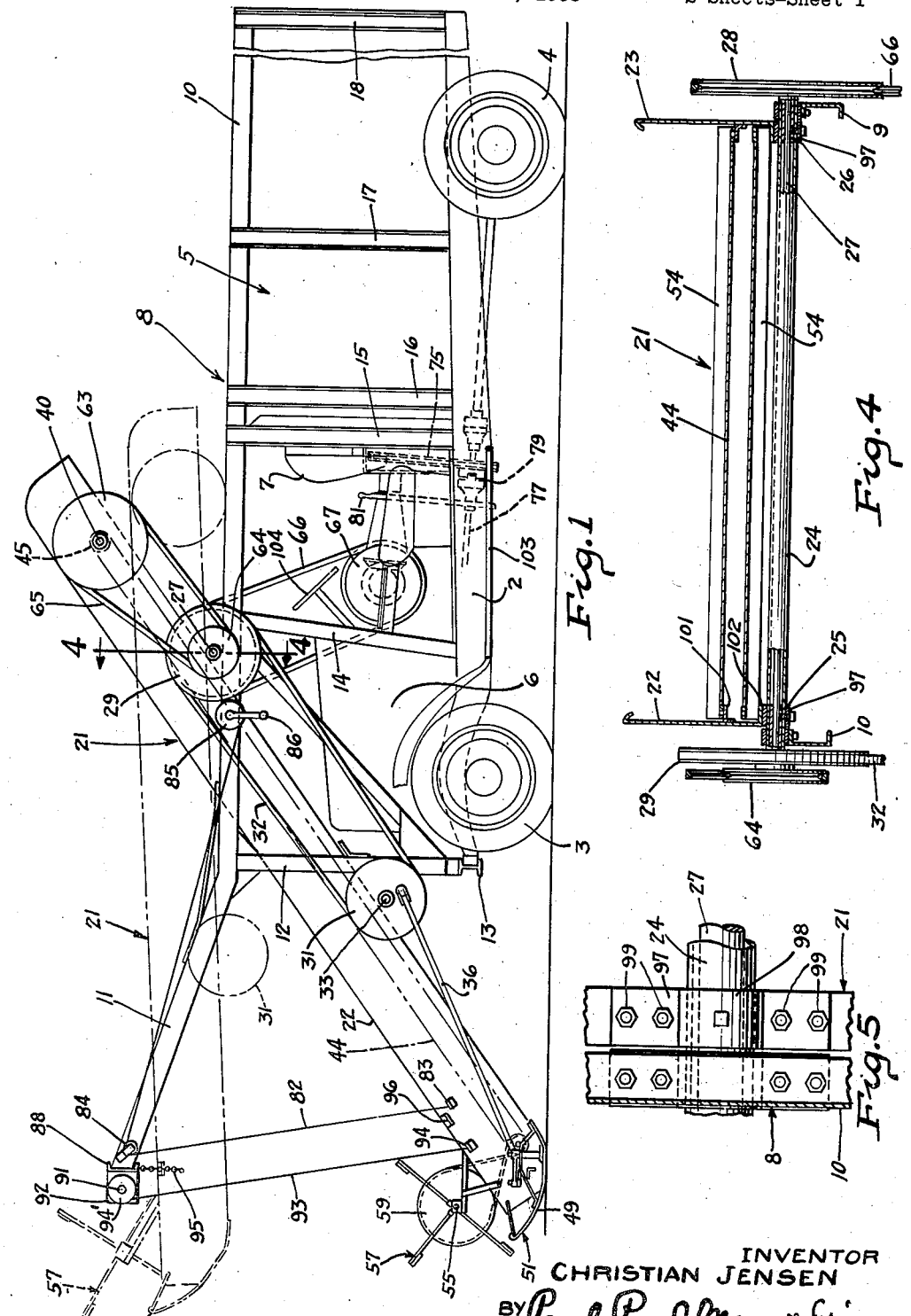
INVENTOR
CHRISTIAN JENSEN
BY Paul, Paul, Moore & Giere
ATTORNEYS July 30, 1940.  C. JENSEN  2,209,625
HAY LOADER
Filed Dec. 1, 1938   2 Sheets-Sheet 2
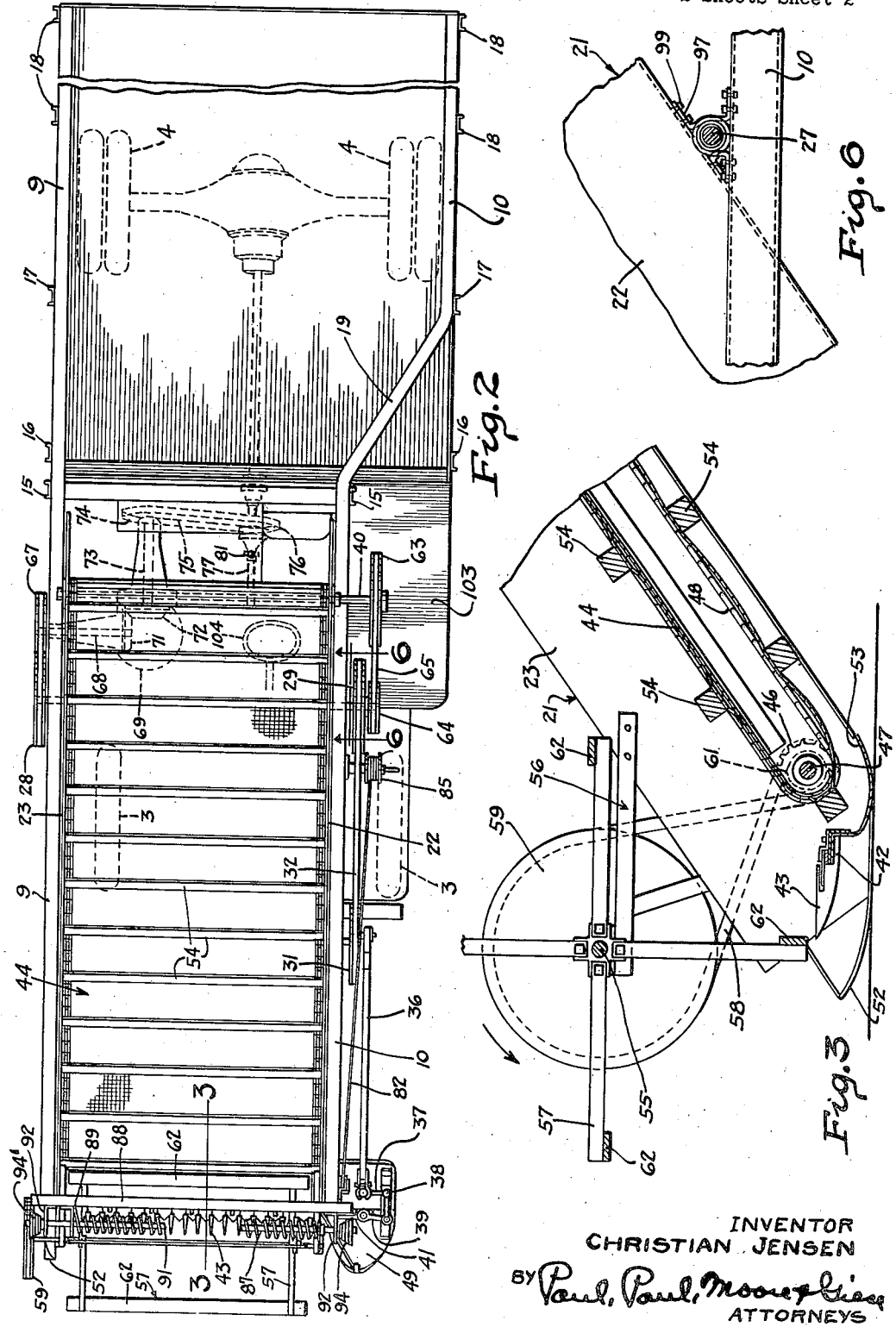
INVENTOR
CHRISTIAN JENSEN
BY Paul, Paul, Moore & Gregg
ATTORNEYS Patented July 30, 1940

2,209,625

UNITED STATES PATENT OFFICE 2,209,625

HAY LOADER

Christian Jensen, Minneapolis, Minn., assignor to Cargill, Incorporated, Minneapolis, Minn., a corporation of Delaware Application December 1, 1938, Serial No. 243,359

1 Claim. (Cl. 56—23)

This invention relates to new and useful improvements in hay loaders, and more particularly to such an apparatus having means for mounting it upon a conventional automotive truck.

An object of the present invention is to provide a hay loader adapted to be mounted on the front end of a truck and having a conveyer positioned over the engine hood and the driver's cab or seat adapted to convey the hay over the front end of the truck and deliver it into the truck body.

A further object is to provide such a hay loader comprising a suitable supporting frame adapted to be mounted upon the truck body and supporting a conveyer having a suitable sickle bar at its front end adapted to cut the hay or other material to be harvested, and a reel being arranged over the sickle bar adapted to engage the cut hay and deliver it on to the conveyer whereby it is elevated over the front end of the truck and delivered into the truck body.

A further object is to provide a hay loader which may be constructed in the form of an attachment for a conventional automotive truck, said loader comprising an endless conveyer mounted for pivotal movement whereby it may readily and conveniently be swung to an inoperative position, when traveling from place to place.

Other objects of the invention reside in the unique construction of the apparatus whereby it may be manufactured at small cost; in the unique manner of mounting it on the truck whereby it will require little attention when in use, and whereby the driver of the truck may readily control the operation of both the truck and the hay loader; in the novel means for driving the hay loader from the usual propeller or drive shaft of the truck, which includes a clutch for controlling the operation of the conveyer and sickle bar of the hay loader; in the construction of the frame of the hay loader which has an offset on one side to provide a station for the operator adjacent the steering wheel of the truck, whereby a single operator may readily control the operation of the entire apparatus; and, in the general construction and arrangement of the various parts of the mechanism whereby it may readily be mounted upon a conventional truck in such a manner that the truck may be used for hauling the mown hay to a stack or a storage building without detaching the hay-cutter and loader from the truck, thereby reducing handling of the material to a minimum, with a resultant saving in labor, and, at the same time, greatly expediting the harvesting of the crop.

Other objects of the invention will appear from the following description and accompanying drawings and will be pointed out in the annexed claim.

In the accompanying drawings there has been disclosed a structure designed to carry out the various objects of the invention, but it is to be understood that the invention is not confined to the exact features shown as various changes may be made within the scope of the claim which follows.

In the drawings:

Figure 1 is a side elevation of a truck showing the novel hay loader mounted thereon;

Figure 2 is a plan view of Figure 1, showing the operator's station;

Figure 3 is an enlarged detail sectional view substantially on the line 3—3 of Figure 2, showing the ground-engaging shoe at the front end of the conveyer;

Figure 4 is a transverse sectional view substantially on the line 4—4 of Figure 1;

Figure 5 is an enlarged detail sectional view showing the means for pivotally supporting the conveyer on the supporting frame; and Figure 6 is a detail sectional view substantially on the line 6—6 of Figure 2, showing the pivotal mounting of the conveyer upon the supporting frame.

In the selected embodiment of the invention here shown there is illustrated in Figure 1, a conventional truck comprising the usual chassis 2 suported on the usual front and rear wheels 3 and 4, and having a body 5 mounted thereon. The usual engine hood 6 is shown over the front wheels 3 for housing the usual vehicle engine, not shown. A driver's seat 7 is shown between the engine hood 6 and the body 5.

The novel hay loader herein disclosed is shown comprising a suitable supporting frame generally indicated by the numeral 8. This frame is preferably constructed of structural steel and comprises upper longitudinally disposed frame members 9 and 10 having their forward end portions 11 bent upwardly, as best shown in Figure 1. The frame members 9 and 10 preferably extend rearwardly, the length of the truck body.

Upright frame members 12 have their upper ends secured to the forwardly extending portions 11 of the frame members 9 and 10 and have their lower ends supported upon a cross member 13, secured to the front end of the vehicle chassis 2. Similar upright frame members 14, 15, 16, 17 and 18 support the frame members 9 and 10 on the truck body.

As best illustrated in Figure 2, the longitudinally extending frame member 10 is offset as shown at 19, while the frame member 9 at the opposite side of the truck is substantially straight. A conveyer, generally indicated by the numeral 21, is mounted for pivotal movement upon the structural frame 8. This conveyer is shown comprising side walls 22 and 23, having their lower portions secured to a suitable tubular cross member 24. The cross member 24 is provided at its ends with suitable bearings 25 and 26 in which is mounted a cross shaft 27 having a sheave 28 secured to one end thereof, as best shown in Figure 4.

A similar sheave 29 is secured to the opposite end of the shaft 27 and has a driving connection with a crank disk 31 through a suitable belt 32. The crank disk 31 is secured to a shaft 33 mounted in suitable bearings secured to the side frame members of the conveyer frame.

The crank disk 31 drives a connecting rod 36 which has its lower end connected to one end of a bell crank 37 mounted on a suitable pivot 38. The opposite end of the bell crank 37 is pivotally connected to one end of a pitman 39, the opposite end of which is connected to a conventional sickle, generally indicated by the numeral 41. The sickle is mounted for reciprocal movement in suitable guides provided in a sickle bar 42, having the usual forwardly extending guards 43 as best shown in Figure 3.

A suitable endless conveyer, generally indicated by the numeral 44, is mounted between the side walls 22 and 23 of the conveyer frame and is supported at its upper end by a suitable roller 45. The lower end of the conveyer 44 is supported on a plurality of spaced sprockets 46, secured to a cross shaft 37. Suitable chains 48 are secured to the conveyer belt and engage the sprockets 46 at the lower end of the conveyer.

The lower end of the conveyer frame has a shoe 49 disposed beneath the bell crank 37. This shoe is adapted to engage the ground, and has its front end curved upwardly as shown at 51 in Figure 1, whereby the shoe may readily ride over irregularities in the surface of the ground during the cutting and loading operation. A similar shoe 52 of smaller size, is provided at the opposite end of the sickle bar adapted to similarly engage the ground, as will readily be understood by reference to Figures 1 and 2. A guard plate 53 extends crosswise of the conveyer directly beneath the shaft 47 and serves to prevent the slats 54 of the conveyer belt from engaging foreign matter upon the ground and carrying it upwardly into the hay or material being cut and delivered into the truck body.

A shaft 55 is provided at the front end of the conveyer frame 21 and is supported in suitable bearings secured to a structural frame, generally indicated by the numeral 56. A suitable reel 57 is secured to the shaft 55 and is driven by a belt 58, operatively connecting a sheave 59 on the shaft 55 to a relatively smaller drive sheave 61, secured to the shaft 47 at the front end of the conveyer. Thus when the cross shaft 47 is rotated the reel 57 will be rotated in the direction indicated by the arrow in Figure 3, whereby all of the cut hay will be thrown backwardly onto the conveyer 44 by the paddles 62 of the reel.

The means for driving the conveyer belt 44 is shown comprising a sheave 63 secured to the cross shaft 40, provided at the upper end of the conveyer, as best shown in Figure 1. This sheave has a driving connecting with a relatively smaller sheave 64 secured to the sheave 29 by suitable belts 65, whereby the conveyer belt will be driven when the sheave 29 is rotated to operate the crank disk 31.

The means for driving the conveyer is best illustrated in Figures 1 and 2, and comprises a belt 66 having a running connection with the sheave 28 and a sheave 67, secured to one end of a short countershaft 68, shown mounted in a suitable housing 69, indicated in dotted lines in Figure 2. The shaft 68 has a bevel gear 71 within the housing 69 which meshes with a similar gear 72 secured to one end of a short shaft 73, to the opposite end of which is secured a suitable sprocket wheel 74. A chain 75 connects the sprocket wheel 74 with a drive sprocket 76 mounted on the usual drive shaft 77 of the truck. A suitable clutch 79 provides means for operatively connecting the drive sprocket 78 to the shaft 77. The clutch 79 has an operating lever 81 located adjacent to the driver's seat whereby the clutch may be conveniently manipulated by the driver to control the operation of the conveyer 44.

Means is provided whereby the front end of the conveyer 44 may be elevated to an inoperative position as indicated in dotted lines in Figure 1. The means provided for thus elevating the conveyer is shown comprising a suitable cable 82 having one end secured to the lower end of the conveyer as indicated at 83 in Figure 1. The cable 82 passes over a sheave 84 provided at the forward end of the side frame member 10, and has its opposite end secured to a drum 85 provided with a crank 86 whereby it may be conveniently operated by the driver to raise or lower the front end of the conveyer.

To facilitate raising and lowering the front end of the conveyer, a suitable tortion spring 87 is shown having one end secured to a cross member 88 at substantially the point indicated by the numeral 89 in Figure 2. The cross member 88 is secured to the front ends of the side frame members 9 and 10. The spring 87 is coiled about a shaft 91 mounted in brackets 92, secured to the cross frame member 88. The opposite end of the tortion spring 87 is secured to the shaft 91, whereby when the shaft 91 is rotated in one direction, as when lowering the conveyer, the spring will be put under tension.

Cables 93 are provided at each side of the front end of the conveyer. These cables have their lower ends secured to the conveyer frame as shown at 94 and have their opposite ends secured to a pair of cone-shaped spiral drums 94' secured to the shaft 91. The drums 94' are so arranged that when the conveyer is in its lowermost position, shown in full lines in Figure 1, the upper ends of the cables will be coiled about the drums 94' at their smallest diameters, and the spring 87 will be under tension and thereby exert an upward pull on the cables 93, thereby to counterbalance the major portion of the weight of the front end of the conveyer, whereby it may readily be raised or lowered by manipulation of the crank 86.

A pair of chains 95 are shown secured to the cross member 88 at the front ends of the longitudinal frame members 9 and 10. These chains are adapted to be engaged with brackets or hook elements 96 secured to the front end of the conveyer, when the latter is elevated to the dotted line position shown in Figure 1, thereby to retain and support the conveyer in its elevated inoperative position independently of the cables 82 and 93, when the conveyer is not in use.

As shown in Figures 5 and 6, the conveyer 21 is detachably supported upon the frame members 9 and 10 so that if desired it may readily be removed therefrom. To thus detachably support the conveyer on the main supporting frame, a pair of brackets 97 are detachably secured to the side frames or walls of the conveyer, and have U-shaped portions 98 adapted to receive the tubular cross member 24, as clearly illustrated in Figures 4, 5, and 6. The brackets 97 are secured to the side members of the conveyer by suitable bolts 99. When the nuts 99 are removed from their respective bolts the brackets 97 may be detached, whereby the conveyer may readily be detached from the supporting frame 8, it being understood that the belt 66 is first removed from the sheave 28, and the cables 82 and 93 disengaged from the front end of the conveyer frame.

Suitable guide rails 101 and 102 are provided on the side walls 22 and 23 of the conveyer for supporting the upper and lower runs of the conveyer belt 44, as clearly illustrated in Figure 4.

In order that a single person may operate the truck and hay loader, a platform 103 is provided on one side of the truck body as shown in Figures 1 and 2. Because of the side frame member 10 of the supporting frame of the conveyer being offset, as shown at 19 in Figure 2, ample room is provided for the operator on the platform 103, whereby he may conveniently operate the usual steering wheel 104 of the truck and also the engine control mechanism, not shown, while standing on the platform 103. From this platform he may also readily observe the operation of the conveyer and as he is stationed along side thereof his vision is not obscured by the front end of the conveyer.

During the loading operation, the driver will be stationed on the platform 103 and will control the operation of the truck and loader from this point. When the truck has received a full load the driver preferably interrupts forward movement of the truck and then elevates the conveyer to the dotted line position shown in Figure 1, by manipulation of the crank 86. The truck is then driven to the stack or a hay storage bin and unloaded after which the driver returns to the field for another load.

It will thus be seen that the novel hay loader herein disclosed is so constructed and arranged upon the truck that a single person may readily manipulate both the truck and hay loader whereby the operation of harvesting the hay or grain is greatly simplified.

I claim as my invention:

In combination with a motor vehicle comprising a frame, an engine provided with a drive shaft, and a driver's seat provided with the usual vehicle controls, an auxiliary frame mounted on the forward end of the vehicle frame and having side members extending forwardly of the front end of the vehicle, said auxiliary frame being substantially longitudinally alined with the vehicle frame, a cross shaft on the auxiliary frame, a conveyer pivotally supported on said shaft and extending forwardly of the vehicle, a sickle bar at the front end of the conveyer, ground engaging shoes on the forward end of the conveyer adapted to retain the sickle bar in spaced relation to the ground surface, when the apparatus is in operation, a second shaft mounted on the conveyer between the sickle bar and the cross shaft and having a crank disk secured to one end thereof, a pitman having one end connected to the crank disk and its opposite end operatively connected to the sickle bar, said cross shaft having driving connections with the conveyer and said second shaft, whereby when the cross shaft is operated, the elevator and sickle bar are operated, said cross shaft also having a clutch-controlled driving connection with the engine drive shaft, whereby the operation of the conveyer and sickle bar may be controlled independently of the traveling movement of the apparatus, an operator's station located at one side of the conveyer adjacent to the driver's seat whereby an operator on said station may have clear vision ahead of the apparatus and whereby he may conveniently manipulate the usual vehicle controls, control means at the operator's station for controlling the operation of the elevator and sickle bar and for vertically adjusting the forward end of the elevator, and means for counterbalancing the forward end of the conveyer.

CHRISTIAN JENSEN.